(12) United States Patent
Monden

(10) Patent No.: US 12,535,673 B2
(45) Date of Patent: Jan. 27, 2026

(54) IMAGING APPARATUS, CONTROL METHOD, AND STORAGE MEDIUM FOR CAPTURING AN IMAGE OF AN OBJECT BY AN OPTICAL SYSTEM

(71) Applicant: CANON KABUSHIKI KAISHA, Tokyo (JP)

(72) Inventor: Kazuhiro Monden, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 18/493,699

(22) Filed: Oct. 24, 2023

(65) Prior Publication Data
US 2024/0142768 A1 May 2, 2024

(30) Foreign Application Priority Data
Oct. 31, 2022 (JP) .................................. 2022-174745

(51) Int. Cl.
G02B 26/02 (2006.01)
G02B 5/20 (2006.01)
H04N 23/65 (2023.01)
H04N 23/667 (2023.01)

(52) U.S. Cl.
CPC ........... G02B 26/023 (2013.01); G02B 5/205 (2013.01); H04N 23/651 (2023.01); H04N 23/667 (2023.01)

(58) Field of Classification Search
CPC .... H04N 23/651; H04N 23/667; H04N 23/65; H04N 23/661; H04N 23/695; G02B 26/023; G02B 5/205; G03B 11/06; G03B 11/043
See application file for complete search history.

(56) References Cited

U.S. PATENT DOCUMENTS

| | | | | |
|---|---|---|---|---|
| 2009/0002823 A1* | 1/2009 | Law | ........................ | G03B 11/06 359/511 |
| 2009/0086101 A1* | 4/2009 | Lee | ........................ | G03B 11/06 348/655 |
| 2019/0229137 A1* | 7/2019 | Kubo | ...................... | H04N 23/54 |
| 2019/0346742 A1* | 11/2019 | Cammenga | ....... | G02F 1/133528 |
| 2021/0006701 A1* | 1/2021 | Sakurabu | ............... | G03B 13/36 |

FOREIGN PATENT DOCUMENTS

JP 2013142713 A 7/2013

* cited by examiner

Primary Examiner — Kelly L Jerabek
(74) Attorney, Agent, or Firm — Canon U.S.A., Inc. IP Division

(57) ABSTRACT

An apparatus includes an element configured to capture an image of an object by an optical system, a first filter disposed closer to an object side than the optical system and configured to attenuate light entering the element, at least one processor, and a memory coupled to the at least one processor and storing instructions that cause the at least one processor to set any of a first mode in which the apparatus performs imaging and a second mode in which the apparatus does not perform imaging but stands by, insert the first filter into an optical path of the element in a case where a mode is shifted from the first mode to the second mode, and remove the first filter from the optical path in a case where the mode is shifted from the second mode to the first mode.

17 Claims, 2 Drawing Sheets

IMAGING APPARATUS, CONTROL METHOD, AND STORAGE MEDIUM FOR CAPTURING AN IMAGE OF AN OBJECT BY AN OPTICAL SYSTEM

BACKGROUND

Field

The aspect of the embodiments relates to an imaging apparatus, a control method, and a storage medium.

Description of the Related Art

In a case where sunlight condensed by a lens is applied to one portion inside a lens barrel for a long period, a resin forming the lens barrel may be thermally damaged.

Japanese Patent Application Laid-Open No. 2013-142713 discusses a technique for changing an optical zoom position to a wide-angle side by a predetermined amount in a case where a predetermined time elapses after both of a camera main body and an imaging lens barrel come into an unmoved state. This prevents the light from being concentratedly applied to one portion inside the lens barrel for a long period.

SUMMARY

According to an aspect of the embodiments, an apparatus includes an element configured to capture an image of an object by an optical system, a first filter disposed closer to an object side than the optical system and configured to attenuate light entering the element, at least one processor, and a memory coupled to the at least one processor, the memory storing instructions that, when executed by the at least one processor, cause the at least one processor to set any of a first mode in which the apparatus performs imaging and a second mode in which the apparatus does not perform imaging but stands by, insert the first filter into an optical path of the element in a case where a mode is shifted from the first mode to the second mode, and remove the first filter from the optical path in a case where the mode is shifted from the second mode to the first mode.

Further features of the disclosure will become apparent from the following description of exemplary embodiments with reference to the attached drawings.

DESCRIPTION OF THE EMBODIMENTS

An exemplary embodiment of the disclosure is to be described in detail with reference to accompanying drawings. The exemplary embodiment to be described below is an example for implementing the disclosure, and should be appropriately modified or changed depending on a configuration of an apparatus to which the disclosure is applied and various kinds of conditions. The disclosure is not limited to the exemplary embodiment. Parts of the exemplary embodiment to be described below may be appropriately combined.

(Apparatus Configuration)

Figure 1:
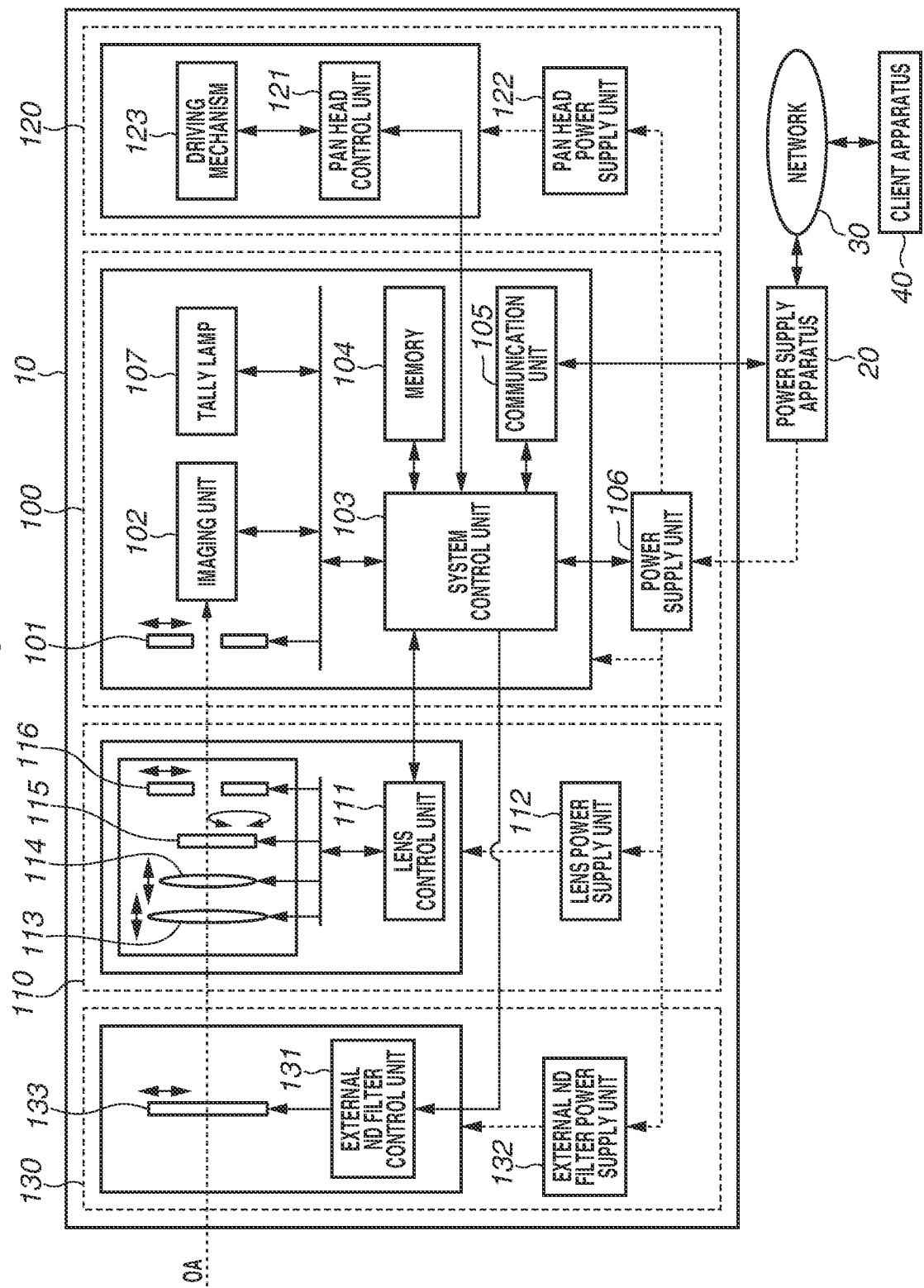
FIG. 1 is a configuration diagram illustrating a system including an imaging apparatus according to an exemplary embodiment.

A configuration of an imaging apparatus according to an exemplary embodiment is to be described with reference to FIG. 1. FIG. 1 is a configuration diagram illustrating a system including the imaging apparatus according to the present exemplary embodiment.

An imaging apparatus 10 is connected to a network 30 such as a local area network (LAN) through a power supply apparatus 20 to be described below, and can communicate with a client apparatus 40 that is an external information processing apparatus connected to the same network 30.

The power supply apparatus 20 supplies power to the imaging apparatus 10. For example, the power supply apparatus 20 is a switching hub supporting Power over Ethernet® (PoE), and can supply power to the imaging apparatus 10 through a LAN cable. In the present exemplary embodiment, the imaging apparatus 10 realizes power reception and network connection by the switching hub supporting PoE, but the power reception and the network connection may be realized by different apparatuses. For example, the imaging apparatus may receive power from a common power supply apparatus, and may be connected to the network through a common switching hub.

The network 30 includes network devices mediating communication between the imaging apparatus 10 and the client apparatus 40 to be described below. For example, the network 30 includes a plurality of network devices (router, switch, cable, etc.) complying with a communication standard such as Ethernet®.

The client apparatus 40 is a computer apparatus connected to the network 30, and can acquire and display a video of the imaging apparatus 10 through the network 30. The client apparatus 40 can set various kinds of parameters and the like of the imaging apparatus 10 by transmitting/receiving control commands for the imaging apparatus 10 through the network 30. For example, the client apparatus 40 is a general-purpose computer such as a personal computer (PC). In FIG. 1, one client apparatus 40 is illustrated, but a plurality of client apparatuses 40 may be provided.

A configuration of the imaging apparatus 10 is to be described in detail. A solid-line arrow extending from each of blocks indicates a flow of data, and a dashed-line arrow indicates a flow of power supply.

The imaging apparatus 10 includes a camera unit 100, a lens barrel unit 110, a pan head unit 120, and an external neutral density (ND) filter unit 130.

The camera unit 100 includes a shutter unit 101, an imaging unit 102, a system control unit 103, a memory 104, a communication unit 105, a power supply unit 106, and a tally lamp 107.

The lens barrel unit 110 includes a lens control unit 111, a lens power supply unit 112, and a zoom lens 113 and a focus lens 114 as a lens group, an ND filter 115, and a diaphragm 116 that are included in an imaging optical system.

The pan head unit 120 includes a pan head control unit 121, a pan head power supply unit 122, and a driving mechanism 123. The driving mechanism 123 is a pan-tilt (PT) mechanism including a pan driving unit and a tilt driving unit for changing an imaging direction.

The external ND filter unit (first filter) 130 includes an external ND filter control unit (control unit) 131, an external ND filter power supply unit 132, and an external ND filter 133. The external ND filter 133 is an ND filter for dealing with outdoor sunlight, and has high optical density as compared with the ND filter (second filter) 115 included in the lens barrel unit 110. In other words, the first filter unit 130 is configured so as to be greater in light attenuation rate (to reduce larger quantity of light) than the second filter 115.

The camera unit 100 and the lens barrel unit 110 are configured to be attachable/detachable through a mount, and the camera unit 100 may capture an image at a different angle of view by replacing the lens barrel unit 110 with a different lens barrel unit. The camera unit 100 and the lens barrel unit 110 may be integrated.

Likewise, the camera unit 100 and the pan head unit 120 may be configured to be attachable/detachable through a mount or may be integrated.

The camera unit 100, the lens barrel unit 110, and the pan head unit 120 except for the external ND filter unit 130 may be shared with members included in an imaging apparatus for indoor imaging. In other words, the imaging apparatus 10 for outdoor imaging may be configured by attaching the external ND filter unit 130 to the imaging apparatus for indoor imaging.

Operation of each of the above-described units is to be described in detail with reference to FIG. 1. An arrow OA in FIG. 1 indicates an optical axis of the imaging optical system (imaging element), and the following description is given based on the premise that a direction in which the optical axis OA extends is an optical axis direction.

The external ND filter 133 provided in the external ND filter unit 130 is a filter disposed on the most object side among the lenses and filters on the optical axis OA provided in the imaging apparatus 10, and is disposed so as to be insertable into/removable from the optical axis OA of the imaging element. The external ND filter 133 is a filter for adjusting intense light in outdoor use, and has density higher than density of the ND filter 115 of the lens barrel unit 110. When the external ND filter 133 is inserted into the optical axis, for example, the light quantity can be adjusted to $1/32$.

The external ND filter control unit 131 receives a driving instruction from the system control unit 103 of the camera unit 100, and controls insertion/removal of the external ND filter 133 in response to the driving instruction.

The external ND filter power supply unit 132 supplies the power supplied from the power supply unit 106 of the camera unit 100 to each of the units of the external ND filter unit 130.

The zoom lens 113 that is disposed on the most object side among the lenses provided in the lens barrel unit 110 is moved in the optical axis OA direction so as to change magnification.

The focus lens 114 disposed closer to an image side than the zoom lens 113 is moved in the optical axis OA direction so as to adjust a focal point.

The ND filter 115 disposed closer to an imaging element than the external ND filter unit 130 is a turret ND filter that adjusts a light quantity in a stepwise manner by rotating a plurality of ND filters different in density to dispose one of the ND filters on the optical axis. In other words, the ND filter 115 is a filter that can adjust a light attenuation rate, and can adjust the light quantity to, for example, clear, $1/2$, $1/4$, $1/8$, and $1/16$. The ND filter 115 is not limited to a filter of the turret type, but may be a filter of a gradation type that can continuously adjust the light quantity from clear to $1/16$.

The aperture diameter of the diaphragm 116 disposed on the most image side is adjusted so as to adjust the light quantity of light entering the camera unit 100. As described above, the first filter is disposed closer to the object side than the second filter. As a result, the image light of the object entering the camera unit 100 is adjusted by the second filter while the light high in luminance like the sunlight in outdoor use is reduced by the first filter, which makes it possible to adjust exposure.

The combination of the lenses, the ND filter, and the diaphragm provided in the lens barrel unit 110 is just an example, and a vibration-proof lens for camera shake correction and the like may be included in the lens barrel unit 110.

The lens control unit 111 receives a driving instruction from the system control unit 103 of the camera unit 100, and controls the zoom lens 113, the focus lens 114, the ND filter 115, and the diaphragm 116 in response to the driving instruction.

The lens power supply unit 112 supplies the power supplied from the power supply unit 106 of the camera unit 100 to each of the units of the lens barrel unit 110.

The shutter unit 101 provided in the camera unit 100 is a light shielding member disposed between the lens barrel unit 110 and the imaging unit 102 on an optical path of a light flux entering from the lens barrel unit 110, and projects the light of the object to the imaging element of the imaging unit 102 for a desired period by running a shutter curtain.

The imaging unit 102 includes the imaging element (not illustrated) such as a charge-coupled device (CCD) sensor and a complementary metal-oxide semiconductor (CMOS) sensor, and images the object. The imaging unit 102 converts an object image output from the imaging element into an electric signal, and inputs the electric signal to the system control unit 103.

The system control unit 103 includes a central processing unit (CPU) or a micro processing unit (MPU), and controls the whole of the imaging apparatus 10.

For example, the system control unit 103 can calculate an exposure control value based on luminance information on a video signal, and can drive the shutter curtain of the shutter unit 101. Further, the system control unit 103 can instruct the lens control unit 111 to drive the ND filter 115 and the diaphragm 116 based on a result of the calculation.

Upon receiving an instruction to change the imaging direction from the client apparatus 40 through the communication unit 105, the system control unit 103 can instruct the pan head control unit 121 to drive the driving mechanism 123.

Upon receiving an instruction to change zoom or focus from the client apparatus 40 through the communication unit 105, the system control unit 103 can instruct the lens control unit 111 to drive and control the zoom lens 113 and the focus lens 114.

Upon receiving an instruction to insert or remove the external ND filter 133 into or from the client apparatus 40 through the communication unit 105, the system control unit 103 can instruct the external ND filter control unit 131 to perform driving for inserting or removing the external ND filter 133.

Upon receiving an instruction to turn on/off the tally lamp 107 from the client apparatus 40 through the communication unit 105, the system control unit 103 can control turning-on/off of the tally lamp 107. The tally lamp 107 includes a green light-emitting diode (LED) and a red LED, and turning-on of the green LED and turning-on of the red LED may be switched in response to the instruction. The system control unit 103 may similarly control the tally lamp 107 in response to input of a tally signal from a tally terminal (not illustrated). In video production, turning-on of the tally lamp notifies surroundings that the video of the imaging apparatus is being used for broadcasting.

Upon receiving a control command about power saving setting of the imaging apparatus 10 from the client apparatus 40 through the communication unit 105, the system control unit 103 can instruct the power supply unit 106 to change power to be supplied to each of the units.

The system control unit 103 includes hardware performing image processing on the video signal, performs image interpolation, color conversion processing, and compression processing on the video signal input from the imaging unit 102, and transmits a resultant video signal to the memory 104 and the communication unit 105. The system control unit 103 can convert the video signal into a signal format suitable for a video interface (not illustrated) such as high-definition multimedia interface (HDMI®) and serial digital interface (SDI), and then transmit the converted video signal.

The memory 104 includes a nonvolatile memory and a random access memory (RAM). The nonvolatile memory stores a processing procedure (program) of the system control unit 103, various kinds of settings, and graphical user interface (GUI) data such as a menu screen. The RAM can be used as a work area for the system control unit 103.

The communication unit 105 is a network processing circuit, and distributes the video signal from the system control unit 103 to the network 30. The communication unit 105 receives various kinds of control commands for the imaging apparatus 10 from the client apparatus 40, and transmits the various kinds of control commands to the system control unit 103. The communication unit 105 transmits a control command response from the system control unit 103 to the client apparatus 40.

The power supply unit 106 supplies the power supplied from the power supply apparatus 20 to each of the units of the camera unit 100, the external ND filter power supply unit 132 of the external ND filter unit 130, the lens power supply unit 112 of the lens barrel unit 110, and the pan head power supply unit 122 of the pan head unit 120.

Upon receiving an instruction to set a power saving mode from the system control unit 103, the power supply unit 106 shifts the mode to the power saving mode, and supplies the power to the system control unit 103, the memory 104, and the communication unit 105, thereby shifting the imaging apparatus 10 to a power saving state. As described above, when a user issues an instruction of power saving setting from the client apparatus 40 at a timing when the user ends imaging, it is possible to suppress power consumption of the whole of the imaging apparatus 10.

The imaging unit 102 does not operate in the power saving mode. For this reason, the video signal is not input to the system control unit 103. Accordingly, various kinds of image processing are not operated, and the video distribution processing through the communication unit 105 is not also operated.

The power is not supplied to the lens barrel unit 110, the pan head unit 120, and the external ND filter 130. For this reason, the user cannot control the units through the control commands.

An instruction to cancel the power saving setting from the client apparatus 40 can be received from the client apparatus 40 through the communication unit 105 even in the power saving mode. The system control unit 103 can control the power supply unit 106 in response to the instruction. Upon receiving an instruction to return the power setting to the normal power setting from the system control unit 103, the power supply unit 106 can shift the mode to a normal mode, and can resume power supply to each of the units.

The driving mechanism 123 provided in the pan head unit 120 includes a direct-current (DC) motor and a stepping motor that are a gear mechanism and a driving source (both not illustrated), and changes the imaging direction by the pan-tilt mechanism.

The pan head control unit 121 receives a driving instruction from the system control unit 103 of the camera unit 100, and performs pan-tilt driving control of the driving mechanism 123 in response to the driving instruction.

The pan head power supply unit 122 supplies the power supplied from the power supply unit 106 of the camera unit 100 to each of the units of the pan head unit 120.

(Description about Operation)

Figure 2:
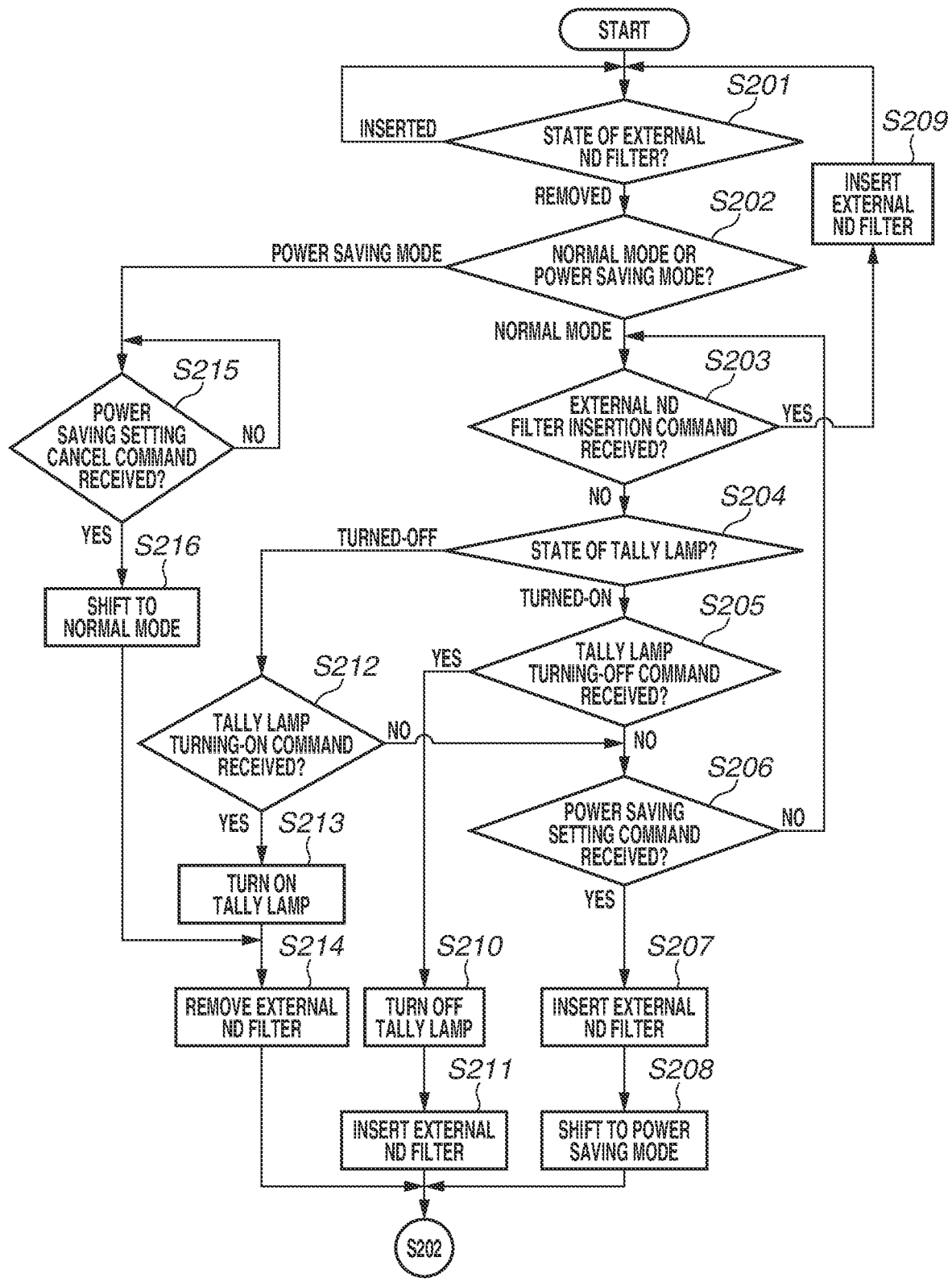
FIG. 2 is a flowchart illustrating characteristic operation according to the present exemplary embodiment.

Characteristic operation of the present exemplary embodiment is to be described with reference to FIG. 2. The operation to be described below is performed by the system control unit 103 of the camera unit 100 of the imaging apparatus 10 based on programs stored in the nonvolatile memory of the memory 104, and is started when power is supplied to the imaging apparatus 10.

In step S201, the system control unit 103 inquires of the external ND filter control unit 131 about a state of the external ND filter 133. In a case where the external ND filter 133 is in an inserted state (INSERTED in step S201), the processing in step S201 is repeated. In a case where the external ND filter 133 is in a removed state (REMOVED in step S201), the processing proceeds to step S202.

In step S202, the system control unit 103 inquires of the power supply unit 106 about a current power state, to determine whether the current mode is the normal mode (first mode) or the power saving mode (second mode). In a case where the current mode is the normal mode (NORMAL MODE in step S202), the processing proceeds to step S203. In a case where the current mode is the power saving mode (POWER SAVING MODE in step S202), the processing proceeds to step S215.

The normal mode is a mode in which the power is supplied to the imaging apparatus 10 and the imaging apparatus 10 performs imaging. A video captured by the imaging apparatus 10 is distributed to an external information processing apparatus (client apparatus 40) connected to the network 30 through the network 30.

The power saving mode is a standby mode in which the power is supplied to the imaging apparatus 10 but the imaging apparatus 10 does not perform imaging, as described above.

In step S203, the system control unit 103 waits for reception of an instruction command to insert the external ND filter 133 from the client apparatus 40 through the communication unit 105. In a case where the system control unit 103 receives the command (YES in step S203), the processing proceeds to step S209. In step S209, the system control unit 103 instructs the external ND filter control unit 131 to insert the external ND filter 133, and the processing then proceeds to step S201. In a case where the system control unit 103 does not receive the instruction command to insert the external ND filter 133 (NO in step S203), the processing proceeds to step S204.

In step S204, the system control unit 103 determines whether the current state of the tally lamp 107 is a turned-on state or a turned-off state. In a case where the current state is the turned-on state (TURNED-ON in step S204), the processing proceeds to step S205. In a case where the current state is the turned-off state (TURNED-OFF in step S204), the processing proceeds to step S212.

In step S205, the system control unit 103 waits for reception of an instruction command to turn off the tally lamp 107 from the client apparatus 40 through the communication unit 105. In a case where the system control unit 103 receives the command (YES in step S205), the processing proceeds to step S210. In a case where the system control unit 103 does not receive the command (NO in step S205), the processing proceeds to step S206.

The tally lamp 107 is turned off in response to the instruction from the client apparatus 40, but may be turned off in response to input of the tally signal from the tally terminal (not illustrated) as described above.

In step S206, the system control unit 103 waits for reception of an instruction command to set the power saving mode from the client apparatus 40 through the communication unit 105. In a case where the system control unit 103 receives the command (YES in step S206), the processing proceeds to step S207. In a case where the system control unit 103 does not receive the command (NO in step S206), the processing proceeds to step S203, and the above-described processing is repeated.

In step S207, the system control unit 203 instructs the external ND filter control unit 131 to insert the external ND filter 133, and the processing proceeds to step S208.

In step S208, the system control unit (setting unit) 103 sets the imaging apparatus 10 to the power saving mode, and instructs the power supply unit 106 to shift the mode to the power saving mode. Thereafter, the processing returns to step S202, and the processing is repeated. In step S210, the system control unit 103 turns off the tally lamp 107, and the processing proceeds to step S211.

In step S211, the system control unit 103 instructs the external ND filter control unit 131 to insert the external ND filter 133 in a manner similar to that in step S207. Thereafter, the processing then returns to step S202, and the processing is repeated.

In step S212, the system control unit 103 waits for reception of an instruction command to turn on the tally lamp 107 from the client apparatus 40 through the communication unit 105. In a case where the system control unit 103 receives the command (YES in step S212), the processing proceeds to step S213. In a case where the system control unit 103 does not receive the command (NO in step S212), the processing proceeds to step S206. The tally lamp 107 is turned on in response to the instruction from the client apparatus 40, but may be turned on in response to input of the tally signal from the tally terminal (not illustrated) as described above.

In step S213, the system control unit 103 turns on the tally lamp 107, and the processing proceeds to step S214.

In step S214, the system control unit 103 instructs the external ND filter control unit 131 to remove the external ND filter 133. Thereafter, the processing returns to step S202, and the processing is repeated.

In step S215, the system control unit 103 waits for reception of an instruction command to cancel the power saving setting (instruction command to set normal mode) from the client apparatus 40 through the communication unit 105. In a case where the system control unit 103 receives the command (YES in step S215), the processing proceeds to step S216. In a case where the system control unit 103 does not receive the command (NO in step S215), the processing in step S215 is repeated.

In step S216, the system control unit (setting unit) 103 sets the imaging apparatus 10 to the normal mode, and instructs the power supply unit 106 to shift the mode to the normal mode. Thereafter, the processing proceeds to step S214.

In the case where the state of the imaging apparatus 10 (power state of power supply unit 106) is shifted from the normal mode to the power saving mode or in the case where the state of the tally lamp 107 is shifted from the turned-on state to the turned-off state by the above-described steps, the external ND filter 133 is inserted. In other words, in a case where the imaging apparatus 10 does not perform imaging or in a case where the imaging apparatus 10 is not used for broadcasting, the external ND filter 133 can prevent intense light from entering the lens barrel unit, which makes it possible to reduce a risk of thermal damage of the lens barrel.

In a case where the power state of the power supply unit 106 is shifted from the power saving mode to the normal mode after the external ND filter 133 is inserted by the above-described processing, the state of the external ND filter 133 can be returned to the removed state.

In the case where the state of the tally lamp 107 is shifted from the turned-off state to the turned-on state, the state of the external ND filter 133 can also be returned to the removed state.

In the present exemplary embodiment, the external ND filter 133 is just inserted when the mode is shifted to the power saving mode, namely, in step S207, but in addition, an attenuation rate of the ND filter 115 disposed in the optical axis OA in FIG. 1 may be increased (or maximized). The aperture diameter of the diaphragm 116 may be reduced. The light entering the imaging unit 102 is further attenuated by the processing. This makes it possible to reduce a risk that the image sensor is deteriorated (sunburned) by the light entering the imaging unit 102 in the power saving mode.

In a case where the processing is performed in step S207, processing for returning the state of the ND filter 115 inserted in step S207 or the state of the diaphragm 116 reduced in aperture diameter in step S207 to an original state is performed when the mode is shifted from the power saving mode to the normal mode, namely, in step S216.

In the present exemplary embodiment, the mode is shifted to the power saving mode in response to the instruction from the client apparatus 40, but the system control unit 103 may control the shift to the power saving mode with absence of an instruction from the client apparatus 40 for a predetermined period as a trigger. In other words, even in a case where it is determined that the imaging apparatus 10 is not used by the user and the mode is automatically shifted to the power saving mode, the external ND filter 133 is inserted into the optical path of the imaging element.

In the present exemplary embodiment, in a case where the mode is shifted from the first mode (normal mode) to the second mode (power saving mode), the first filter (external ND filter) is inserted into the optical path of the imaging element, whereas in a case where the mode is shifted from the second mode to the first mode, the first filter is removed from the optical path. At this time, the first mode and the second mode may be a distribution mode and a non-distribution mode, respectively. In other words, a mode in which the video captured by the imaging apparatus 10 is distributed to the client apparatus 40 may be the first mode, and a mode in which the video captured by the imaging apparatus 10 is not distributed to the client apparatus 40 may be the second mode. In this case, the external ND filter 133 is inserted in a case where the mode is shifted from the distribution mode to the non-distribution mode. This makes it possible to reduce a quantity of light entering the lens barrel during non-distribution, and to prevent thermal damage of the lens barrel.

It is possible to protect the lens barrel from a risk of thermal damage caused by intense light such as sunlight entering the lens barrel without changing an optical zoom position.

Although the exemplary embodiment of the disclosure is described above, the disclosure is not limited to the exemplary embodiment, and can be variously modified and changed within the scope of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-174745, filed Oct. 31, 2022, which is hereby incorporated by reference herein in its entirety.

What is claimed is:

1. An apparatus comprising:
an element configured to capture an image of an object by an optical system;
a first filter disposed closer to an object side than the optical system and configured to attenuate light entering the element; and
one or more processors configured to:
set any of a first mode in which the image captured by the apparatus is distributed to another apparatus and a second mode in which the image captured by the apparatus is not distributed to the other apparatus;
insert the first filter into an optical path of the element in a case where a mode is shifted from the first mode to the second mode; and
remove the first filter from the optical path in a case where the mode is shifted from the second mode to the first mode.

2. The apparatus according to claim 1, further comprising a second filter disposed closer to the element than the first filter and configured to be insertable into and removable from the optical path of the element,
wherein the second filter adjusts an attenuation rate of the light entering the element, and
wherein an attenuation rate of the first filter is higher than that of the second filter.

3. The apparatus according to claim 2, wherein, in the first mode, exposure of the object is controlled by adjusting the attenuation rate of the second filter.

4. The apparatus according to claim 2, wherein the attenuation rate of the second filter is increased in the case where the mode is shifted from the first mode to the second mode.

5. The apparatus according to claim 1, further comprising a diaphragm configured to adjust a quantity of the light entering the element,
wherein the one or more processors are further configured to reduce an aperture diameter of the diaphragm in the case where the mode is shifted from the first mode to the second mode.

6. The apparatus according to claim 1,
wherein the one or more processors are further configured to receive an input for setting any of the first mode and the second mode from an information processing apparatus, and
wherein the first filter is inserted into the optical path of the element in response to an input of an instruction to shift the mode from the first mode to the second mode.

7. The apparatus according to claim 6, wherein the first filter is inserted into the optical path of the element in a case where an instruction is not input to the apparatus from the processing apparatus for a predetermined period.

8. A method of controlling an apparatus, the apparatus including an element configured to capture an image of an object by an optical system and a first filter disposed closer to an object side than the optical system and configured to attenuate light entering the element, the method comprising:
setting any of a first mode in which the image captured by the apparatus is distributed to another apparatus and a second mode in which the image captured by the apparatus is not distributed to the other apparatus;
inserting the first filter into an optical path of the element in a case where a mode is shifted from the first mode to the second mode; and
removing the first filter from the optical path in a case where the mode is shifted from the second mode to the first mode.

9. The method according to claim 8,
wherein the apparatus further includes a second filter disposed closer to the element than the first filter and configured to be insertable into and removable from the optical path of the element,
wherein the second filter adjusts an attenuation rate of the light entering the element, and
wherein an attenuation rate of the first filter is higher than that of the second filter.

10. The method according to claim 9, wherein, in the first mode, exposure of the object is controlled by adjusting the attenuation rate of the second filter.

11. The method according to claim 9, wherein the attenuation rate of the second filter is increased in the case where the mode is shifted from the first mode to the second mode.

12. The method according to claim 8,
wherein the apparatus further includes a diaphragm configured to adjust a quantity of the light entering the element, and
wherein an aperture diameter of the diaphragm is reduced in the case where the mode is shifted from the first mode to the second mode.

13. The method according to claim 8, further comprising receiving an input for setting any of the first mode and the second mode from a processing apparatus,
wherein the first filter is inserted into the optical path of the element in response to an input of an instruction to shift the mode from the first mode to the second mode.

14. The method according to claim 13, wherein the first filter is inserted into the optical path of the element in a case where an instruction is not input to the apparatus from the processing apparatus for a predetermined period.

15. A non-transitory computer-readable storage medium storing a program for causing a computer to execute a method of controlling an apparatus, the apparatus including an element configured to capture an image of an object by an optical system and a first filter disposed closer to an object side than the optical system and configured to attenuate light entering the element, the method comprising:
setting any of a first mode in which the image captured by the apparatus is distributed to another apparatus and a second mode in which the image captured by the apparatus is not distributed to the other apparatus;
inserting the first filter into an optical path of the element in a case where a mode is shifted from the first mode to the second mode; and
removing the first filter from the optical path in a case where the mode is shifted from the second mode to the first mode.

16. The non-transitory computer-readable storage medium according to claim 15,
wherein the apparatus includes a second filter disposed closer to the element than the first filter and configured to be insertable into and removable from the optical path of the element, the second filter adjusting an attenuation rate of the light entering the element, and an attenuation rate of the first filter being higher than that of the second filter, and
wherein, in the first mode, exposure of the object is controlled by adjusting the attenuation rate of the second filter.

17. The non-transitory computer-readable storage medium according to claim 15, further comprising receiving an input for setting any of the first mode and the second mode from a processing apparatus,
wherein the first filter is inserted into the optical path of the element in response to an input of an instruction to shift the mode from the first mode to the second mode.

* * * * *